BEST AVAILABLE COPY

DESIGN.

A. E. GRAY.

COAT.

Reissued Oct. 19, 1920. 14,960.

APPLICATION FILED AUG. 16, 1920.

2 SHEETS—SHEET 1.

INVENTOR

Annie E. Gray,

WITNESS

F. J. Hartman.

BY J. Stuart Freeman, ATTORNEY

BEST AVAILABLE COPY

DESIGN.

A. E. GRAY.

COAT.

Reissued Oct. 19, 1920. 14.960.

APPLICATION FILED AUG. 16, 1920.

2 SHEETS—SHEET 2.

INVENTOR

Annie E. Gray,

WITNESS

F. J. Hartman.

BY J. Stuart Freeman,

ATTORNEY

BEST AVAILABLE COPY

UNITED STATES PATENT OFFICE.

ANNIE E. GRAY, OF PHILADELPHIA, PENNSYLVANIA.

DESIGN FOR A COAT.

14,960. Specification for Reissued Design. Reissued Oct. 19, 1920.

Original No. 55,944, dated August 3, 1920, Serial No. 362,786, filed March 2, 1920, for 3½ years. Application for reissue filed August 16, 1920. Serial No. 404,025. Term of patent 14 years.

*To all whom it may concern:*

Be it known that I, ANNIE E. GRAY, a citizen of the United States, and a resident of Philadelphia, county of Philadelphia, and State of Pennsylvania, have invented a certain new, original, and ornamental Design for Coats, as shown in the accompanying drawings, in which—

Figure 1:
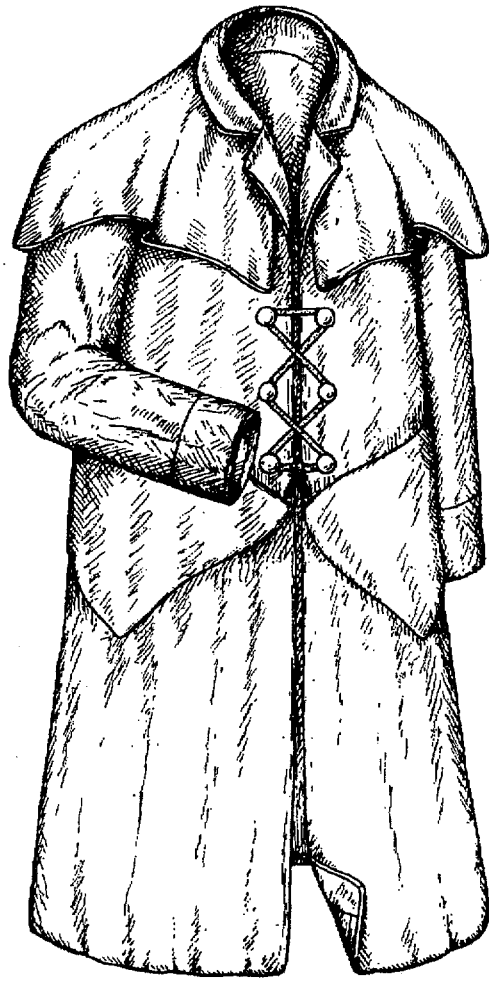
Figure 2:
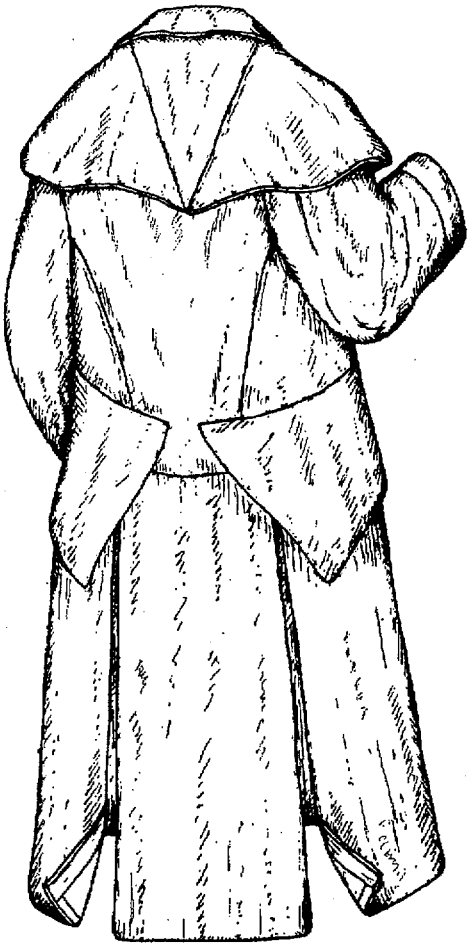

Figure 1 is a front elevation of a coat embodying the new design; and Fig. 2 is a rear elevation of the same.

I claim:

The ornamental design for a coat substantially as shown.

In witness whereof I have hereunto set my hand this 12th day of January, A. D., 1920.

ANNIE E. GRAY.

Witnesses:

J. STUART FREEMAN,
MERRILL T. CRAMER.